United States Patent [19]

Banthia et al.

[11] Patent Number: 5,059,056
[45] Date of Patent: * Oct. 22, 1991

[54] EXTRUDED NODE

[75] Inventors: Vinod K. Banthia, Monroeville; Russell S. Long, Elizabeth Township, Allegheny County; James D. Klingensmith, Allegheny Township, Armstrong County, all of Pa.

[73] Assignee: Aluminum Company of America, Pittsburgh, Pa.

[*] Notice: The portion of the term of this patent subsequent to Jan. 29, 2008 has been disclaimed.

[21] Appl. No.: 636,327

[22] Filed: Dec. 31, 1990

Related U.S. Application Data

[62] Division of Ser. No. 320,250, Mar. 7, 1989, Pat. No. 4,988,230.

[51] Int. Cl.$^5$ ............................. F16B 7/00; F16B 1/00
[52] U.S. Cl. ..................................... 403/170; 403/174; 403/178; 403/205; 403/231; 403/403; 52/648; 52/655
[58] Field of Search .................. 403/170–178, 403/205, 230, 231, 403; 52/81, 280, 648, 655, 656, 726

[56] References Cited

U.S. PATENT DOCUMENTS

| | | | |
|---|---|---|---|
| 323,705 | 8/1885 | Maunder | 403/218 X |
| 2,742,690 | 4/1956 | Kunkel | 29/417 |
| 2,990,203 | 6/1961 | Grover et al. | 403/174 |
| 3,218,097 | 11/1965 | Bowers et al. | 403/295 |
| 3,485,519 | 12/1969 | Chiu | 403/172 |
| 3,791,091 | 2/1974 | Albrizzi | 52/593 |
| 3,851,601 | 12/1974 | Davis | 108/153 |
| 4,027,987 | 6/1977 | Berkowitz | 403/172 |
| 4,036,371 | 7/1977 | Michael | 211/182 |
| 4,076,432 | 2/1978 | Glaser | 403/171 X |
| 4,261,148 | 4/1981 | Scott | 52/285 |
| 4,353,661 | 10/1982 | Bobath | 403/205 |
| 4,385,850 | 5/1983 | Bobath | 403/205 |
| 4,460,288 | 7/1984 | Schaff | 403/27 |
| 4,618,163 | 10/1986 | Hasler et al. | 280/785 |
| 4,660,345 | 4/1987 | Browning | 403/171 X |
| 4,709,241 | 11/1987 | Cusson | 343/916 |
| 4,712,942 | 12/1987 | Brown | 403/174 |
| 4,988,230 | 1/1991 | Banthia et al. | 403/170 |

FOREIGN PATENT DOCUMENTS

| | | | |
|---|---|---|---|
| 1415658 | 9/1965 | France | 403/170 |
| 454555 | 6/1968 | Switzerland | 403/170 |
| WO8502234 | 5/1985 | World Int. Prop. O. | 403/172 |

OTHER PUBLICATIONS

"Structural Impact and Crashworthiness: volume I", Ed. GAO Davies, Elsevier Applied Science Publishers, London, 1984.

(List continued on next page.)

Primary Examiner—Randolph A. Reese
Assistant Examiner—Franco S. DeLiguori
Attorney, Agent, or Firm—William J. O'Rourke; David W. Brownlee

[57] ABSTRACT

An extruded node is disclosed comprising a longitudinally extending substantially hollow core and at least one longitudinally extending, hollow flange, extending outwardly of and integral with a longitudinally extending side portion of the core. This invention also provides a joined structure wherein at least one longitudinally extending lineal member has a hollow peripheral portion defined by walls having inside surfaces adapted to mate with outside surfaces of a mating hollow flange of the extruded node. In this joined structure the peripheral portion of the lineal member is inserted over the hollow flange of the node to an extent that the outer peripheral surface of the lineal member surrounds the integral wall of the node and the outside surfaces of the sidewalls of the hollow flange and the inside surfaces of the lineal member mate along substantially the entire length and around substantially the entire perimeter of the flange.

5 Claims, 7 Drawing Sheets

OTHER PUBLICATIONS

S. R. Reid, "Laterally Compressed Metal Tubes as Impact Energy Absorbers", *Structural Crashworthiness*, Ed. N. Jones and T. Wierzbicki, Butterworths, London, 1983, pp. 1-43.

P. H. Thornton, H. F. Mahmood and C. L. Magee, "Energy Absorption by Structural Collapse," *Structural Crash Worthiness*, Ed. N. Jones and T. Wierzbicki, Butterworths, London, 1983, pp. 96-114.

E. Huang et al., "Static and Dynamic Final Element Analysis of Structural Crashworthiness in the Automotive and Aerospace Industries", *Structural Crashworthiness*, Ed. N. Jones and T. Wierzbicki, Butterworths, London, 1983, pp. 175-217.

M. M. Kamal and J. A. Wolf, "Modern Automotive Structural Analysis," Van Nostrand Reinhold Company, New York, 1982, pp. 85-87.

"Proving Ground Vehicle Corrosion Testing," proposed Draft 2, SAE J1950, Society of Automotive Engineers, Warrendale, Pa. 15096.

EXTRDUED NODE

This application is a division of application Ser. No. 07/320,250, filed March 7, 1989, now U.S. Pat. No. 4,988,230.

BACKGROUND OF THE INVENTION

1. Field of the Invention

This invention pertains to connecting devices and more particularly to extrusions from which are made extruded nodes used to connect hollow lineal members, and to joined structures that include such extruded nodes.

2. Description of the Art

There are various structures directed toward increasing the strength of a joint between a connecting device and the members attached to it. For example, the practice of drilling through two items to be connected, then rivet bonding the items, is well known in the art. Yet, creating a joint by this method is both time-consuming and expensive. Similar joining methods include resistance spot welding and adhesive bonding. Many developments in the connecting device art have been directed toward lowering the cost of the devices, and decreasing the time and complexity of the joining process while simultaneously maintaining or increasing the strength characteristics, durability, and reliability of the joining devices and the ultimately formed joint.

Some examples of connecting devices of the prior art include the devices disclosed in U.S. Pat. Nos. 2,742,690; 2,990,203; 3,218,097; 3,791,091; 3,851,601; 4,027,987; 4,261,148; 4,353,661; and 4,385,850. These references are directed toward the use of core members onto which protruding members may be applied. Some of the core members of the prior art are used to connect members which protrude from the core at angles, in instances where the complete product cannot be directly manufactured in a single unit. A common example of a core member is the corner joint of a multipiece window frame structure, or the corner member of wall panels, or a central member of a furniture structure or scaffolding.

An exemplary area where the present invention is particularly applicable is in providing structural frame members for vehicles, such as automobiles, airplanes, railway cars, trucks and the like. For over the past decade there has been a thrust in vehicle manufacturing to reduce the overall weight of the vehicle. In the automotive industry success has been attained not only through downsizing of the automobile, but also through the use of lightweight substitute materials, such as aluminum, in place of heavier materials, such as steel. Prior to 1973 what little aluminum was used in cars was typically employed for nonstructural applications. Today there is a significant increase in the aluminum usage primarily in structural applications, such as frames, bodies, drive trains and the like. Note for example U.S. Pat. No. 4,618,163 which pertains to an automobile chassis that includes extruded light metal rods.

The present invention is particularly, though not exclusively, useful in the manufacture of vehicles, such as automobiles. This invention provides benefits in the area of lightweighting with the use of aluminum extrusions, in structural applications, through the use of unique connecting devices. Connecting devices of light metals, such as aluminum, provide ductility, i.e., the ability to be subjected to substantial deformation without fracturing, in addition to providing light weight. Connecting devices that might be employed in the manufacture of automobiles, though successful, may be further improved or replaced by the devices of the present invention. These prior art devices include certain adhesive bonded applications and certain other devices, including but not limited to cast nodes. Extruded nodes may be welded or mechanically joined to extruded lineal members or other lineal members without the necessity for adhesive bonding. In the manufacture of extruded nodes, there is little or no difficulty in holding close dimensional tolerances; thus subsequent machining of the product to hold dimension is typically not required in extrusions. Also the use of extrusions typically results in high quality welds without porosity problems in applications where extruded nodes are welded to other extruded members, such as aluminum extrusions. Additionally, the yield strength and tensile strength of extruded nodes are typically substantially higher than that of other alternative types of nodes.

Accordingly, improved metallic connecting devices are desired which are ductile, lightweight, thin walled, easily connected and provide adequate strength characteristics.

SUMMARY OF THE INVENTION

This invention may be summarized as providing an improved extruded node comprising a longitudinally extending substantially hollow core and at least one longitudinally extending, hollow flange extending outwardly of and integral with a longitudinally extending side portion of the core. This invention also provides a joint wherein longitudinally extending lineal members have a hollow peripheral portion defined by walls having inside surfaces adapted to mate with outside surfaces of a mating hollow flange of the extruded node. In this joint the peripheral portion of the lineal member is mated with the hollow flange of the node, to an extent that the outer peripheral surface of the lineal member surrounds the integral wall of the node, and the outside surfaces of the sidewalls of the hollow flange and the inside surfaces of the lineal member mate along substantially the entire length and around the perimeter of the flange.

Among the advantages of the present invention is the provision of an extruded node which has adequate strength characteristics.

Another advantage of the present invention is that the node may be utilized as a core member of a connection device which can be made to close dimensional tolerances by extrusion methods and still retain adequate ductility and strength characteristics.

A feature of the present invention is the provision of an extruded node having a substantially hollow core and hollow flanges. Advantages of the hollow structure are that the node weight may be reduced substantially when compared to most other nodes including certain cast nodes and solid nodes, and that structural support may be maintained in the node and in the joined structure.

Another advantage of the present invention is that the joined structure has lineal members attached to hollow flanges of the extruded node without requiring the use of adhesives.

Another advantage of this invention is that the connecting device is thin walled and highly ductile.

An objective of this invention is the provision of a joined structure having the peripheral edges of lineal members inserted onto hollow flanges of a node and welded to the node about a solid node wall between the central core of the node and the base of the outwardly extending hollow flange. Preferably, the joined structures, the node and the lineal members are extruded aluminum alloys characterized by a high quality weld therebetween.

These and other objectives, features and advantages of the invention will be more thoroughly understood and appreciated with reference to the following description and the accompanying drawings.

DESCRIPTION OF THE PREFERRED EMBODIMENTS

Figure 1:
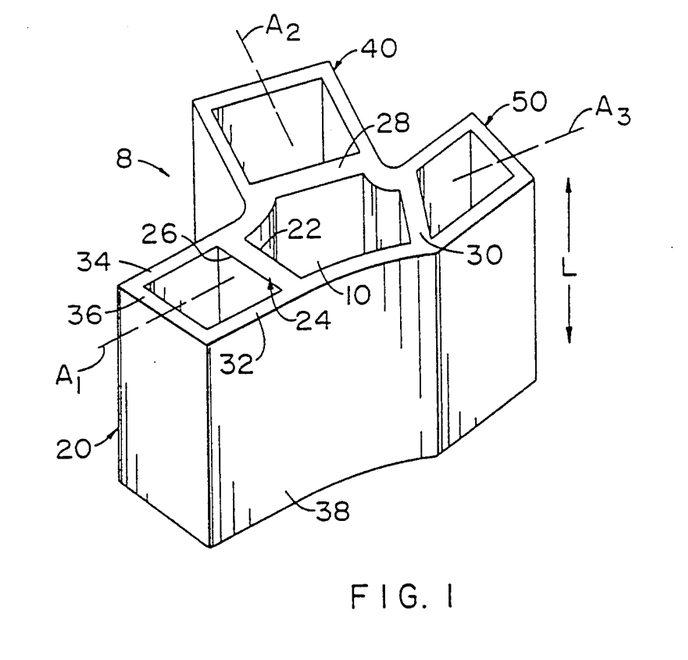
FIG. 1 is a perspective view of a node of the present invention.

Referring to the drawings, FIG. 1 illustrates a typical extruded node of the present invention. Nodes of the present invention are preferably metallic extrusions. Preferably, the extruded products of this invention are light metals, such as aluminum. Preferable materials for extruding the nodes of the present invention include aluminum alloys containing silicon and magnesium in proportions that make them heat treatable, such as the 6XXX series aluminum alloys, particularly including aluminum alloys 6009, 6010, 6061, 6063 and similar alloys.

Typical nodes and lineal members of this invention are made of extruded aluminum alloy. As mentioned above, aluminum alloys are particularly adapted to this invention, although other materials are comprehended. Extruded nodes and extruded lineal members exhibit metallurgical and physical properties, such as alloy consistency, dimensional stability, ductility and strength, which are enhanced and more consistent than those typically obtained by other processes such as casting. However, it should be appreciated that the joint of this invention comprehends metallic nodes having flanges which connect lineal members of any material, including composites, formed sheet, and others.

Figure 14:
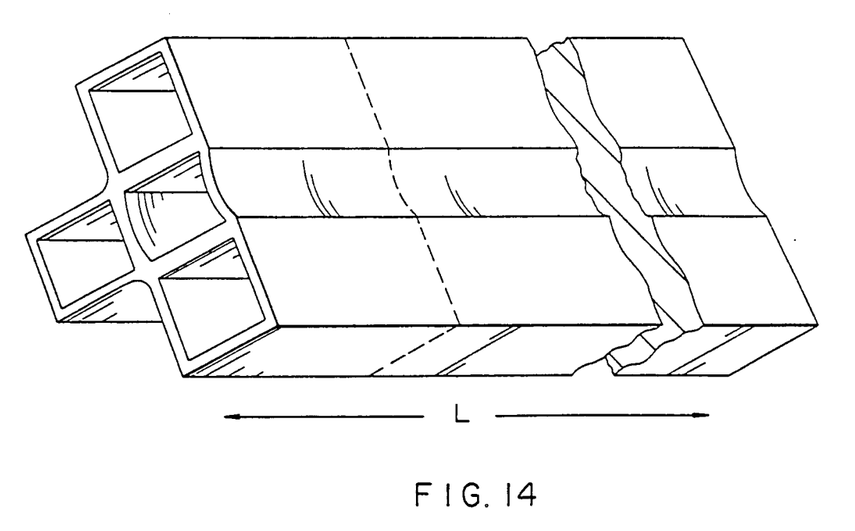
FIG. 14 is a perspective view of an extrusion of the present invention from which nodes of this invention may be cut.

The node of the present invention is a core element from which at least one and usually multiple hollow flanges extend, and onto which lineal members are joined. Such elements are typically structural frame members. The node of this invention is a segment of a substantially longer product that is extruded, i.e., shaped by forcing through dies under pressure, to form longitudinally extending elements which may be cut into sections to form the extruded node, such as that shown in FIG. 1. FIG. 14 shows an extrusion from which nodes of the present invention may be cut or otherwise separated. It is desirable, from the perspective of manufacturing cost and speed, that the nodes of the present invention be segments of long length extrusions. Thus the node shown in FIG. 1 is typically a sectional piece of a substantially longer extrusion. Manufacture by this extrusion and separating technique has been found to have cost advantages and has been found to produce nodes of finished dimension which have not been attainable consistently in the prior manufacture of nodes, whether by casting or otherwise.

In extruding products, an ingot or billet is forced to flow under pressure through a die opening to form an elongated shape. As mentioned above, the nodes of the present invention are segments of such elongated shape. As shown in FIG. 14, an elongated extruded product may be separated into segments, such as by cutting or shearing along the dashed lines in FIG. 14 to produce nodes of this invention. An elongated shape, extruded in the longitudinal direction, designated by reference letter L in the drawings, is separated into segments to form nodes, such as the node shown in FIG. 1.

Figure 2:
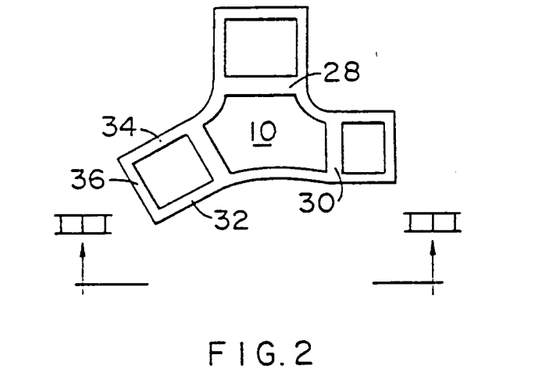
FIG. 2 is a top plan view of the node shown in FIG. 1.
Figure 12:
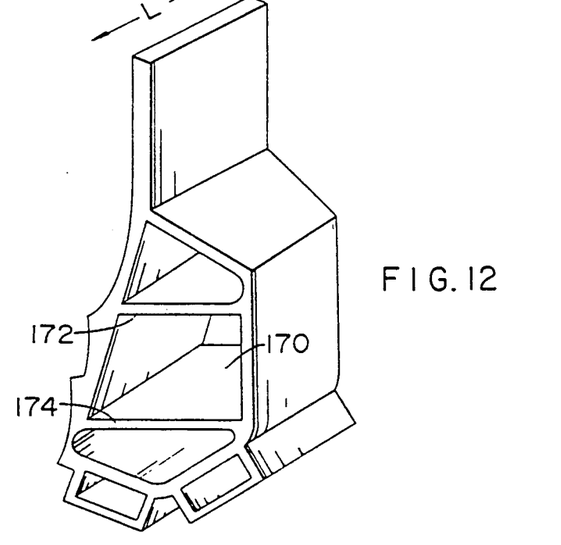

As shown in FIG. 1, and in the top plan view of FIG. 2, a preferred node of this invention has a longitudinally extending, substantially hollow core portion 10. The hollow core is typically centrally located within the node. By substantially hollow it is meant that the majority of the cross section is hollow; however, core walls, such as walls 172 and 174 shown in FIG. 12 and in other Figures, may be provided within the core for a variety of reasons. The longitudinal extent or the longitudinal direction of the node connotes the extrusion direction and is shown as dimension L in the Figures. The node also includes at least one longitudinally extending, hollow flange, such as flange 20. The embodiment illustrated in FIG. 1 shows three longitudinally extending hollow flanges 20, 40 and 50. The flange 20 extends outwardly of and is integral with a longitudinally extending side portion 22 of the central core portion 10. As shown in the preferred embodiment in the drawing, at least two opposite faces of the flange are parallel to one another.

The hollow configuration of the node of the present invention is primarily desirable to reduce the weight of the structure. There are of course practical limits on the lightweighting that can be accomplished. However, it has been found that flange walls with thickness on the order of from 1 to 4 millimeters can be made to within close tolerance, such as half standard tolerance as currently determined by the Aluminum Association. It should also be noted that aluminum extrusions may exhibit minimum yield strengths on the order of about 36 to 38 ksi and minimum tensile strengths on the order of about 40 to 42 ksi.

In a preferred embodiment, the walls, such as wall 24, formed where the longitudinally extending side portion 22 of the central core 10 and the longitudinally extending base portion 26 of an outwardly extending flange, such as flange 20, are common, are thicker than the wall thickness of the remaining, noncommon walls of the node. For example, common walls 24, 28 and 30 may be twice the thickness of the noncommon walls of the node, such as sidewalls 32 and 34 and end walls 36 of the flange. As will be explained in detail later, a purpose for providing common walls between the core and the flange or flanges of substantial thickness is to provide a structure around which the peripheral edge of a mating lineal member inserted over the node may be welded to the node.

Figure 18:
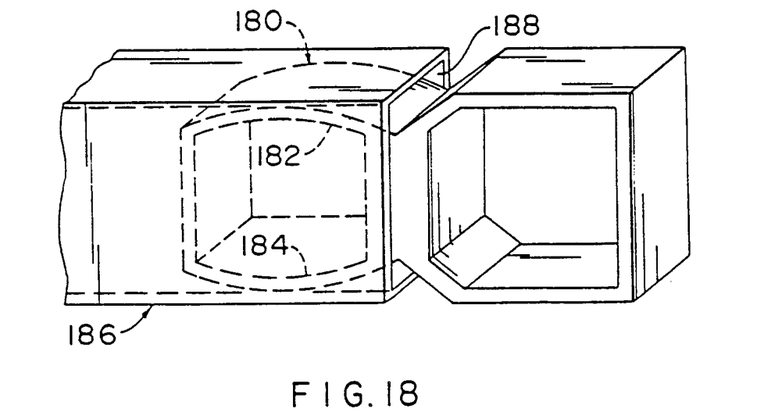

The flange 20 extending outwardly of the node of this invention has a pair of longitudinally extending sidewalls 32 and 34. These sidewalls are substantially planar, as shown in FIG. 1. However, alternative configurations including curvilinear are encompassed within the scope of this invention. Curvilinear configurations, such as curvilinear walls 182 and 184 shown in FIG. 18, may not provide an optimum fit in certain applications. However, such curvilinear walls on hollow node flange 180 may be used in certain applications, such as where the lineal 186 applied to the flange 180 can be held for the given application, or where dissimilar material may be force fit together, or where the space 188 between the outside of the curvilinear wall and the inside of the lineal member can accommodate a weld, adhesive or other bonding mechanism. As shown in the preferred embodiments shown in the drawing, at least two opposite faces of the outwardly extending flange are parallel to one another. Such parallel faces could be the outside surfaces of wall 32 and wall 34 as shown in FIG. 2, or the top and bottom faces 33 and 43, though partially removed, of flange 20 shown in FIG. 3.

The flange 20 of this invention also includes a longitudinally extending end wall 36 integrally connecting the outer portions of the sidewalls 32 and 34 of the flange. Enclosing the flange 20, with an end wall 36, has significant advantages. One advantage is structural integrity. The end wall 36 of the flange 20 assures that the sidewalls 32 and 34 are not deformed during production or during subsequent handling, and thereby helps maintain the dimensional tolerances and requirements of the node, particularly the flanges. Also, the end wall 36 provides structural reinforcement for the joined structure after a lineal member has been connected to the flange of the node. Although the end wall 36 shown in the drawing is located at the outer peripheral edge of the sidewalls 32 and 34 of the flange 20, the end wall 36 could be disposed slightly inwardly, toward the central core 10, of the sidewalls 32 and 34. In such alternative embodiment the peripheral edge portion of the sidewalls may extend outwardly beyond the end wall 36. However, the end wall defines a hollow flange and provides structural reinforcement for the node and for the joined structure.

In a preferred embodiment the end wall 36 of the flange integrally connects the sidewalls 32 and 34 of the flange at the outer peripheral end portions of the sidewalls 32 and 34, along substantially the entire length, or longitudinal extension, of the flange 20. This structure may be accomplished, for example in the extrusion process for extruding the long product from which the node is cut. In such an extrusion process, the cross-sectional configuration of the central core 10, and the cross-sectional configuration of the common walls 26, 28 and 30, as well as the cross-sectional configuration of the hollow flange 20, would be the same along the entire length, or longitudinal extension, of the extruded product, and thus along the entire length, or longitudinal extension, of the extruded node. Therefore, the openings through the central core 10 and the flanges are parallel to one another in the longitudinal direction. Although various polygons, including rectangular, triangular, and even circular cross-sectional configurations, are encompassed for the central core of the present invention, a preferred cross-sectional configuration for the central core is that of a trapezium, i.e., a four sided figure in which no two sides are parallel. Such configuration lends itself to a preferred embodiment in which multiple flanges, such as 20, 40 and 50 as shown in FIG. 1, extend outwardly of the central core 10 such that the general axis $A_1$, $A_2$ and $A_3$, of the outwardly extending flanges form oblique angles to one another. By oblique it is meant that the angles formed between the general axes of the flanges deviate from the perpendicular or from the horizontal, and more particularly means that such angles are acute, less than 90°, or are obtuse, greater than 90°, but less than 180°. Providing such oblique angles is found to be particularly useful in accommodating the various angular dispositions of the elements found in various structures, particularly vehicle frames, such as automotive and truck chassis.

Figure 3:
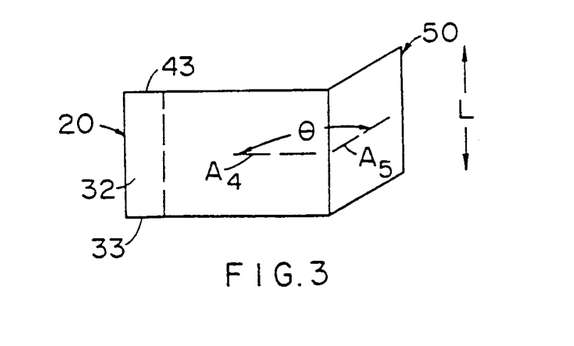
FIG. 3 is a side elevation view of the node shown in FIG. 1.

As is best shown in FIG. 3, one flange 20 on the node of this invention extends outwardly in substantially the same plane as the core 10, while another flange 50 extends outwardly and upwardly of the core 10. Thus, the lineal members attached to the flanges lie in different planes. In this embodiment, the general axes $A_4$ and $A_5$ of flanges 20 and 50, respectively, form oblique angle to one another. In this illustration, an oblique angle $\theta$ of about 140° to 160°, and preferably 150°, is formed between the general axis of one flange 20 and the general axis of the other flange 50. Note again, however, that the openings through the central core 10 and the flange are parallel to one another in the longitudinal direction.

Figure 4:
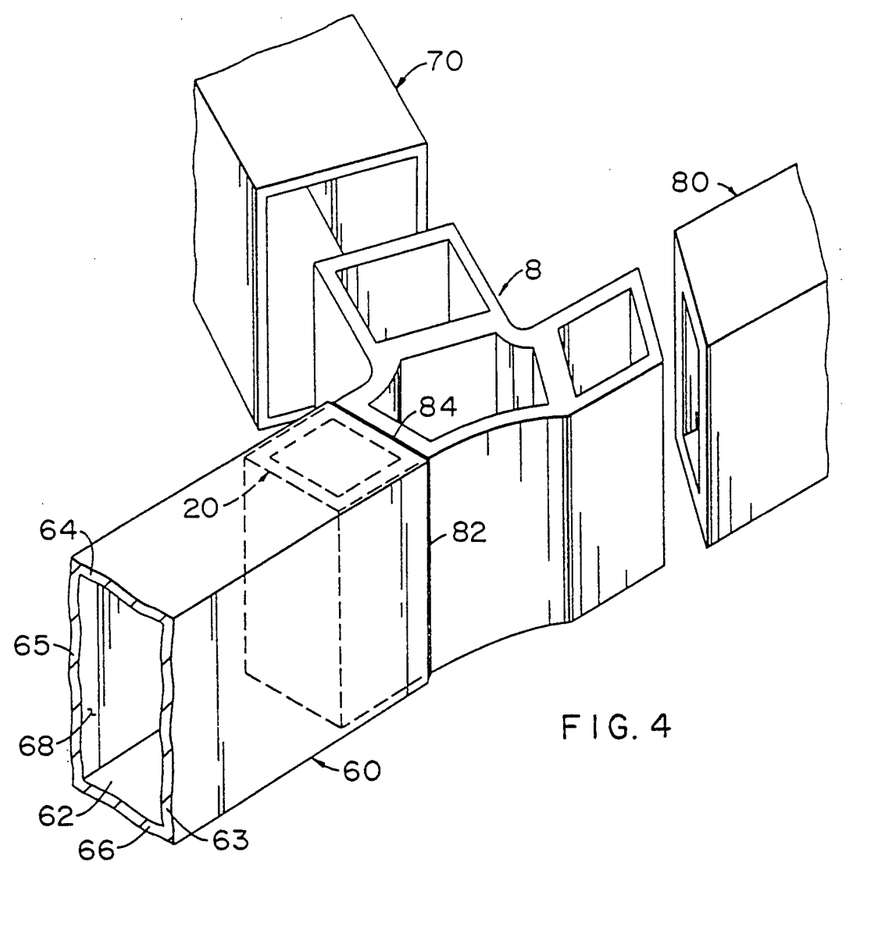
FIG. 4 is a perspective view of a structure of the present invention, showing one lineal member joined to the node, and two other lineal members disposed for joining to the node.
Figure 5:
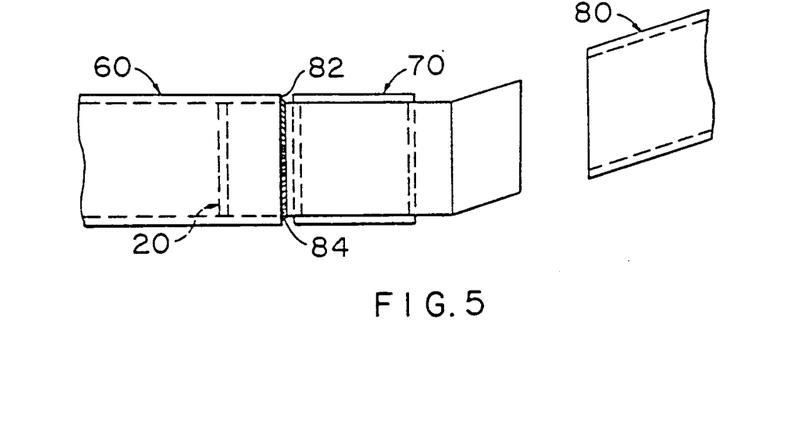
FIG. 5 is a side elevation view of the structure shown in FIG. 4.

Referring again to the drawings, FIG. 4 shows perspective view of a structure of the present invention having one lineal member 60 joined to the flange 20 of the node, and two other lineal members 70 and 80 disposed for joining to the other flanges of the node. In the joined structure of the present invention, it is intended that the structure remain joined. Rapid disassembly not a feature of this invention. In fact, in vehicular applications the joined structure of this invention intended to exhibit improved crushability. Note also that the hollow structure of the core of the node of the present invention permits absorption of a portion of a impact within the hollow zone.

The longitudinally extending lineal members 60, 7 and 80 may be extruded aluminum members. The long tudinal extent of the lineal members connotes the extru sion direction. A perpendicular alignment between the extruded node and a lineal member is particularly appl cable for lineal members lying generally in substantial the same plane as the node.

It is noted that connecting extruded nodes to e truded lineal members has attendant advantages. T close dimensional tolerance of extrusions permits tig fits between mating extrusions. Extrusion to extrusic welding may be superior to welding of extrusions dissimilar product where porosity may be a probler Extrusion to extrusion assemblies may behave bett and more predictably in impact situations. Also, in i stances where assemblies are heat treated, extrusion extrusion assemblies should respond more uniformly such heat treatment.

A lineal member, such as member 60, has a hollo peripheral portion 62 defined by walls 63, 64, 65 and having inside surfaces 68 adapted to mate with outsi surfaces 38 of a mating hollow flange 20. The line member is adapted to mate with the flange by having substantially conforming shape at the mating surfaces 38 and 68. Although a rectangular shape is shown and described, it should be understood that other cross-sectional configurations for the mating surfaces 38 and 68 of the lineal member 60 and the flange 20, including grooved surfaces and mating keys and keyways, are also comprehended by this invention.

The hollow peripheral portion of the lineal member 60, 70 or 80, typically forms a female component of the joined structure of this invention. The flange 20 on the node forms the male component of the joined structure. In a preferred embodiment for the joined structure, the peripheral portion 62 of the lineal member 60 is disposed over the hollow flange 20 to an extent that the outer peripheral edge 82 of the lineal member 60 surrounds the integral wall 24 formed between the central portion 10 of the node and the outwardly extending flange 20.

Preferably, the interface between the flange 20 and the joined lineal member 60 provides a tight fit. For example, the peripheral end portion 62 of the flange 60 could be force fit over the flange 20 such that substantial or adequate compressive forces hold these elements in place. The dimensional fit should be as tight as possible, and in certain instances may require auxiliary equipment to complete the assembly because of a tight fit. Generally, the gap between the mating surfaces should be less than about 0.060 inch in order that welding may be accomplished in one pass, ideally with robotic welding equipment. It will be understood that dimensional uniformity of an extruded node will be a function of the extrusion process in one direction, and the function of the cutting or machining processes in the other direction. In a preferred embodiment a weld is provided to bond the edge 63 of the peripheral end portion 62 of the lineal member to the extruded node. Ideally the weld 84 is provided around the peripheral end portion 62 of the lineal member 60 to attach the lineal member 60 to the extruded node about a node wall 26 formed between the core 10 and the hollow flange 20. Preferably, the thickness of this node wall 26 is adequate to provide structural support and to provide sufficient base metal to insure a high quality, non-porous weld about the entire periphery of the end portion of the lineal member 60. It will be appreciated by those skilled in the art that welds connecting extruded aluminum nodes to extruded aluminum lineal members are higher quality welds than those typically provided between dissimilar product forms. In a preferred embodiment, the thickness of the node wall 26, which corresponds to the peripheral weld location, is thicker than the wall thickness of the other walls 32, 34 and 36 of the flange 20. In instances where post-weld aging is required, the use of an assembly of extruded nodes and extruded lineal members allows uniform thermal treatment for all components of the joined structure. In a preferred embodiment as shown in FIGS. 1 and 4, the wall thickness of the walls 63, 64, 65 and 66 of the lineal member may be from 1.0 to 4.0 mm; the wall thickness of the flange walls 32, 34 and 36 may be from 3.0 to 4.0 mm; while the wall thickness of the common, integral wall 26 between the central core 10 of the node and the hollow flange 20 may be greater than the thickness of the other walls, and preferably in the range of from 5 to 15 mm.

Figures 6, 7, 8:
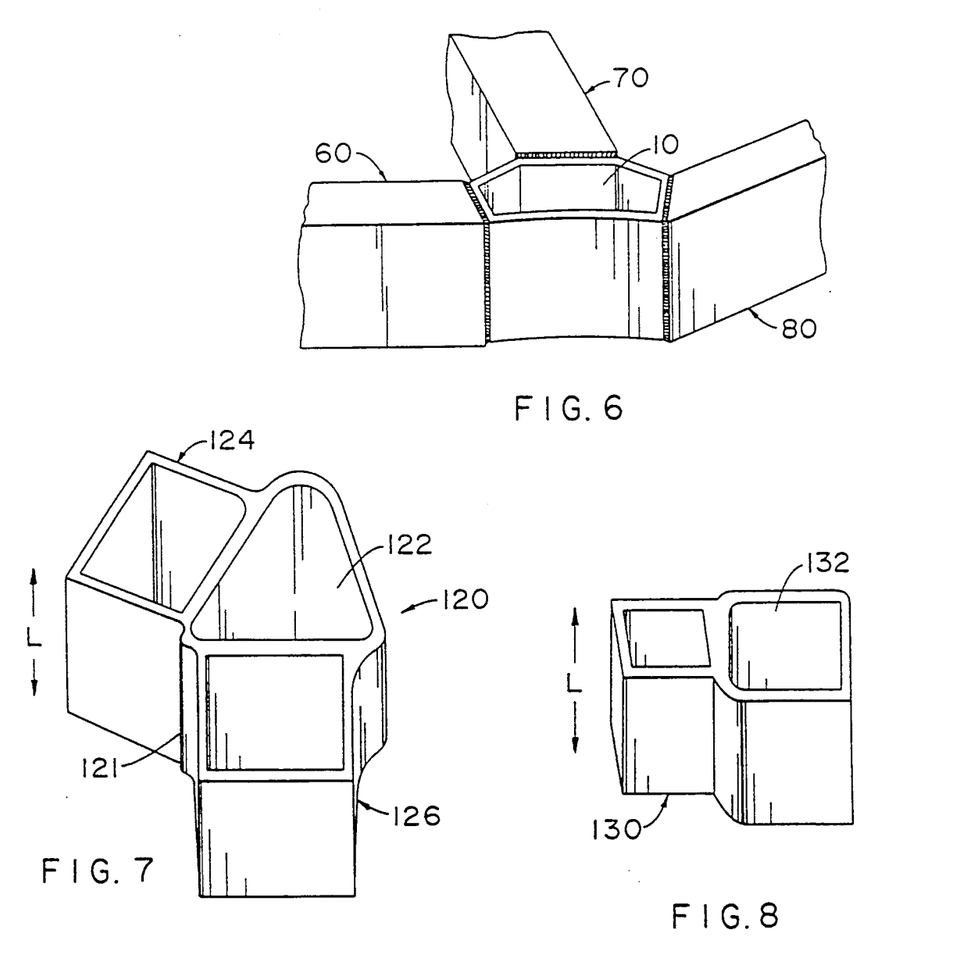
FIG. 6 is a perspective view of a joined structure of the present invention.
FIGS. 7-12 are perspective views of alternative nodes of the present invention.

FIG. 6 shows a joined structure of this invention having three lineal members 60, 70 and 80 disposed over and onto outwardly extending flanges of an extruded node. The attachment of lineal members 70 and 80, and the disposition of these lineal members 70 and 80 with respect to their mating flanges follows the same configuration as is described above for the disposition of lineal member 60 onto the hollow flange 20.

In the structure shown in FIG. 6, the central core 10 of the node remains exposed after the lineal members are mounted onto the mating flanges. This open central core 10 may be desirable in certain situations, particularly to maximize the lightweighting benefits, yet in other applications it may be desirable to enclose the central core 10. In the latter instance the central core may be enclosed by placing a mating cover over the top and bottom exterior edge surfaces of the central core 10, and welding the cover to the exterior edge surface of central core 10. Such welding could be accomplished simultaneously with the welding of the peripheral surfaces of the lineal members to the central core. Alternatively, fitted inserts of the same or dissimilar material could be provided over the core of the node to enclose the hollow portion.

Figure 13:
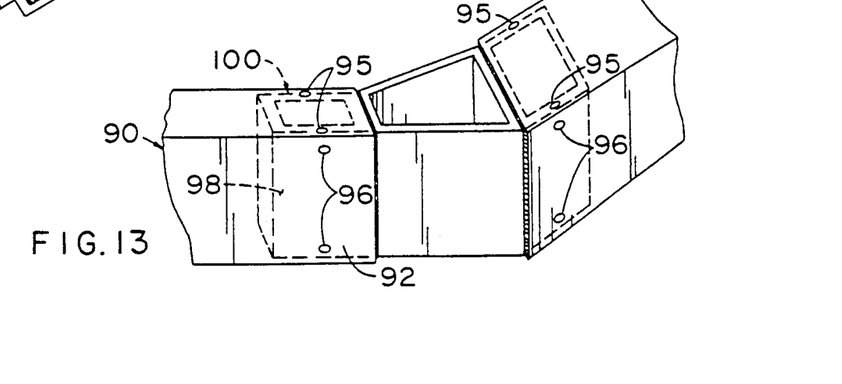
FIG. 13 is a perspective view of an alternative joined structure of the present invention.

As is shown in FIG. 13, for certain applications it may be desirable to remove small sections in the peripheral portion 92 of a lineal member 90 to provide holes or slots, such as 95 and 96. These slots 95 and 96 which may be of various size and configuration provide locations where additional welding may be provided to increase the bond between the lineal member 90 and the outside surface 98 of the flange 100 over which the lineal member 90 is disposed.

Various alternative embodiments are illustrated in the drawings. FIG. 7, for example, shows an extruded node 120 having a hollow core 122 of generally triangular cross-sectional configuration. It is noted that the configuration of the flange could also be modified from that illustrated in the drawing. Extending outwardly of the central core 122 of the node shown in FIG. 7 are two longitudinally extending, thin walled, hollow flanges 124 and 126 disposed at an oblique angle to one another. Note also in FIG. 7 the provision of a rib 121 extending outwardly of the core 122 of the node. Such a rib 121 may be provided to serve as a locating device or a stop for lineal members applied onto the flange 126. By pushing a lineal member onto the flange 126 until the peripheral end of the lineal abutted the rib 121 would insure that the periphery of the lineal member is ideally located for completing a fit, and for subsequent welding of the lineal member to the node about a common wall between the core of the node and the mating flange.

Figure 9:
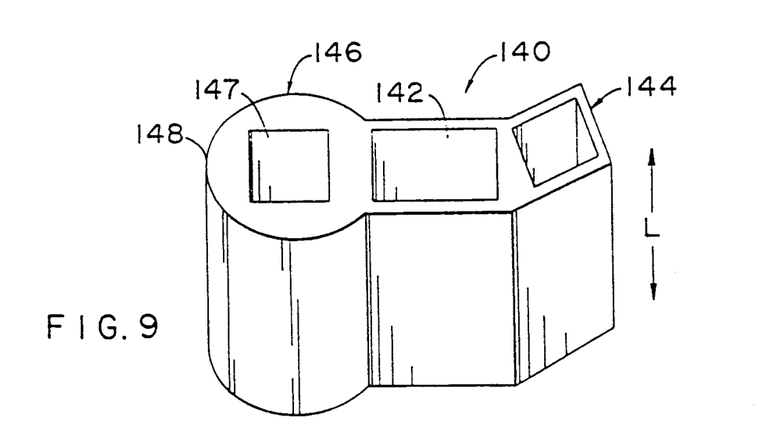

FIG. 8 illustrates an embodiment wherein only one longitudinally extending, thin walled hollow flange 130 extends outwardly of a hollow core. In such an embodiment, lineals may be provided over the flange 130, and perhaps in certain instances over the core as well. FIG. 9 shows an extruded node 140 having a hollow core 142 of generally rectangular cross-sectional configuration, and two outwardly extending hollow flanges 144 and 146. One of the flanges 146 has an inside surface 147 of rectangular cross-sectional configuration, and an outside surface 148 of circular cross-sectional configuration. This is merely one example of the flexibility in shape that is available with extruded nodes of the present invention. In this embodiment, a lineal member may be disposed over flange 144, while the other flange 146 may comprise a portion of a vehicle frame member, such as a car door frame.

Figure 10:
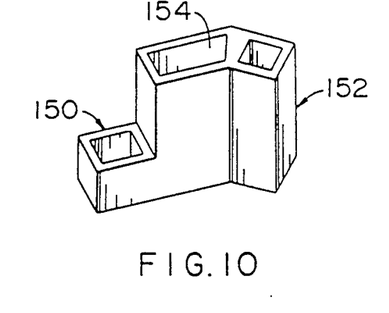
Figure 11:
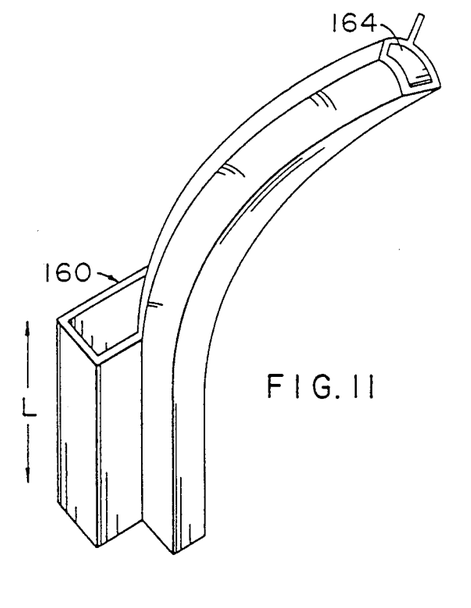

FIGS. 10 and 11 show embodiments of this invention wherein the outwardly extending, hollow flanges 150 and 152 in FIG. 10, or 160 in FIG. 11, do not have the same longitudinal extent as the hollow core portion 154 or 164. Such embodiments have applications where lineal members of different size are applied to extruded nodes. A preferred method of making such nodes is to extrude the node with the central portion 154 and all of the flanges 150 and 152, having the same longitudinal extent L. Then, that longitudinal portion of the flange which is not required would be removed, such as by milling or blanking. As shown in FIG. 11, a subsequent bending operation may be performed on all or part of the node.

Figure 15:
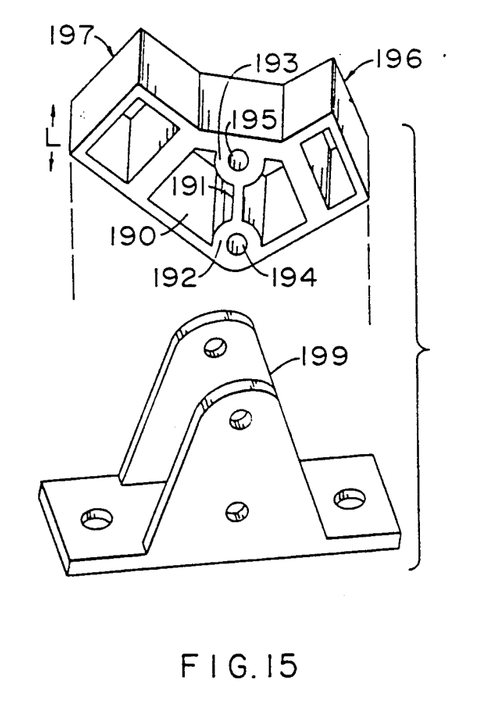
FIGS. 15-20 are perspective views of alternative nodes of the present invention.
Figure 16:
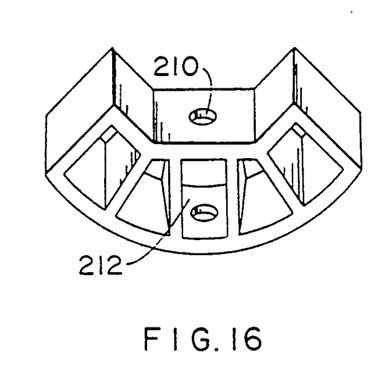

FIGS. 15 and 16 show nodes of the present invention which may be bolted into position. Bolting options may simplify and ease replacement such as during vehicle repair. As shown in FIG. 15, the central core 190 of the node is divided by a core wall 191. At the base of the core wall are thickened sections 192 and 193 through which bolt holes 194 and 195 are provided. Note that bolt holes could be provided in the extrusion process, or by subsequent machining. FIG. 15 shows a receptacle 199 to which the node may be bolted. Lineal members would be attached to the flanges 196 and 197 either before or after bolting to the receptacle 199 generally as described above.

FIG. 16 shows an alternative embodiment in which a bolt hole 210 has been provided, such as by machining, through the central core 212 of the node. Such bolt hole may be used to position the node of this invention.

Figure 17:
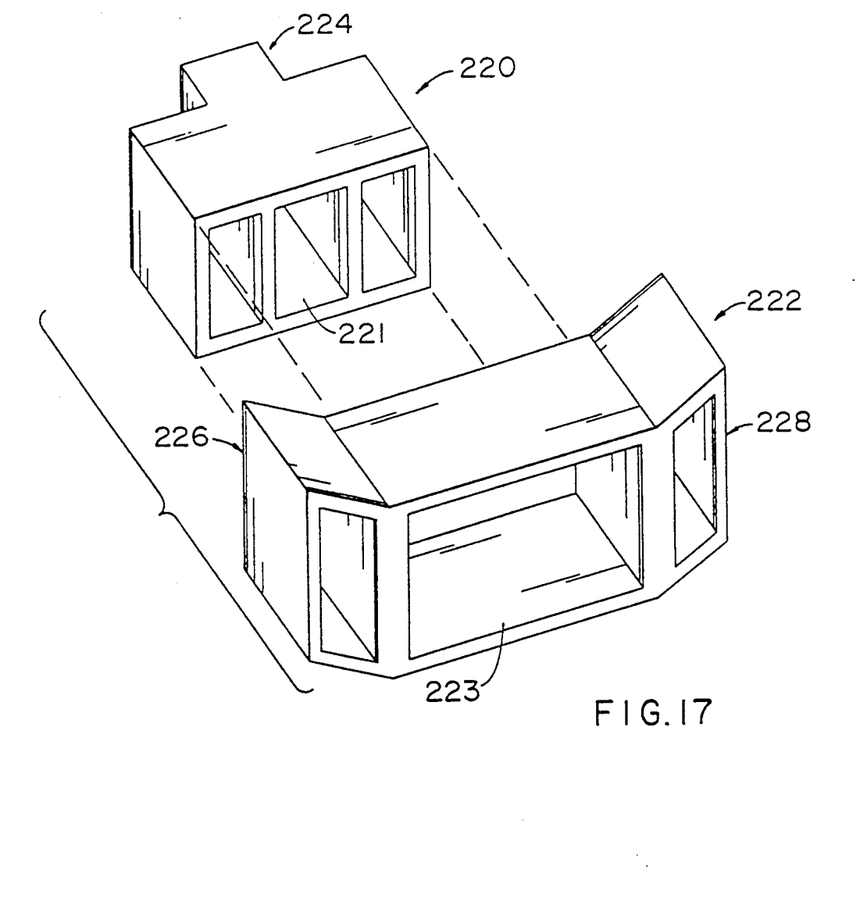

Another embodiment is illustrated in FIG. 17. Note that two nodes 220 and 222 are provided, each with a hollow core 221 and 223, respectively, and outwardly extending hollow flanges. The smaller node 220 has an outwardly extending flange 224, the larger node 222 has two outwardly extending flanges 226 and 228. In this embodiment the core of the smaller node 221 is designed to nest inside the core 223 of the larger node 222 to result in a multipiece assembled node having three outwardly extending flanges 224, 226 and 228 onto which lineal members may be applied. This embodiment permits the extruded shapes to be cut at even intervals and, when assembled, provides multi-directional flanges with little or no machining requirements. In this embodiment the flange 224 may also serve as a female member into which a lineal member may be inserted, while the other flanges 226 and 228 would serve as male members onto which lineal members would be inserted.

Figure 19:
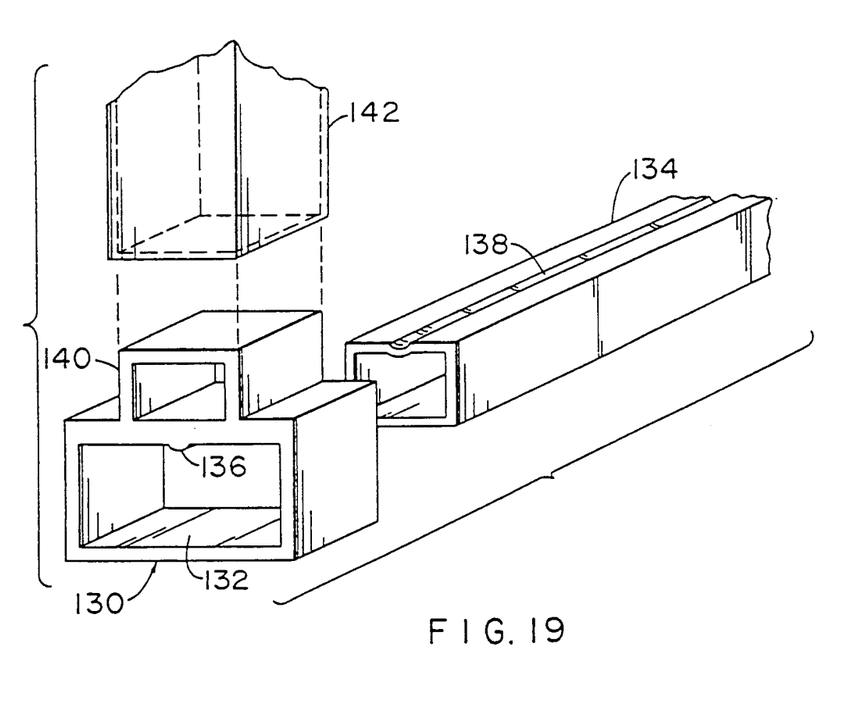

A further embodiment is illustrated in FIG. 19 which shows a node 130 having a hollow core portion 132. The central core 132 is adapted to receive a lineal member, such as lineal member 134, in tight fitting engagement through the core 132. Note that the saddle type fit may be enhanced or promoted, such as with the use of extruded keys, such as key 136, and mating slots, such as slot 138, in the lineal member. The node of this embodiment has an outwardly extending flange 140 onto which a lineal member 142 may be applied. It will be appreciated that multiple flanges may be provided in this embodiment.

Figure 20:
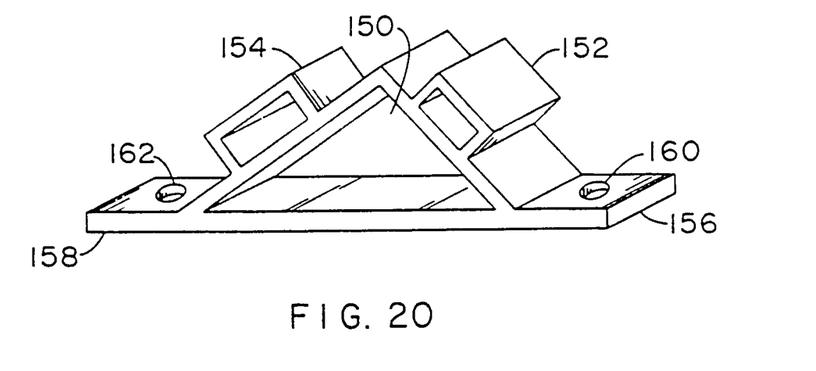

The embodiment of FIG. 20 also shows the versatility provided with extruded nodes. In the node of FIG. 20 is a central core 150, two outwardly extending hollow flanges 152 and 154 for receiving lineal members, and other flanges 156 and 158 which may be provided with bolt holes 160 and 162 for attaching the node to another surface.

What is believed to be the best mode of this invention has been described above. It will be apparent to those skilled in the art that numerous variations of the illustrated details may be made without departing from this invention.

We claim:

1. In a vehicle frame wherein end portions of a plurality of lineals are interconnected by nodes in a structural vehicular frame construction, the improvement comprising: a multipiece extruded, aluminum alloy node having a substantially hollow body and at least one hollow male member having spaced apart sidewalls extending from the body, said sidewalls integrally connected by an endwall, said sidewalls and endwall having a wall thickness less than about four millimeters, said male member projecting from the body at an oblique angle for assembly and bonding with female ends of said lineals through an interconnecting fit and through an auxiliary assembly means selected from the group consisting of welding, adhesive bonding and combinations thereof, said hollow body and hollow male member having parallel openings through the node in a longitudinal direction.

2. An extruded node as set forth in claim 1 wherein one piece of the node fits inside the core of another piece of the node.

3. An extruded node as set forth in claim 1 wherein each piece of the multipiece node has a substantially hollow core, and at least one hollow flange extending outwardly of the core.

4. In a vehicle frame wherein end portions of a plurality of lineals are interconnected by nodes in a structural vehicle frame construction, the improvement comprising a joined structure for said vehicle frame comprising
   an extruded node having a longitudinally extending substantially hollow core, and at least one longitudinally extending, hollow flange having spaced apart sidewalls extending from the core, said sidewalls integrally connected by an endwall, said sidewalls and endwall having a wall thickness less than about four millimeters, said flange extending outwardly of and integral with a longitudinally extending side portion of the core, defining a common wall therebetween at an oblique angle thereto, said flange on the node forming a male component of the joined structure;
   a longitudinally extending lineal member, having hollow peripheral portion defined by walls having inside surfaces adapted to mate with outside surfaces of a mating hollow flange of the node, the hollow peripheral portion forming a female component of the joined structure;
   the peripheral portion of the lineal member permanently disposed over the hollow flange to an extent that an outer peripheral surface along the end the peripheral portion of the lineal member surrounds the common wall of the node and is assembled therewith by an interconnecting fit between mating surfaces of the lineal member and the hollow flange and by auxiliary assembly means selected from the group consisting of welding, adhesive bonding and combinations thereof; and
   the outside surfaces of sidewalls of the hollow flange and the inside surfaces of the lineal member mate along substantially the entire longitudinal extension and around the perimeter of the flange, the outside surface of said lineal member including a longitudinally extending portion and the inside surface said core including a longitudinally extending portion mating with said lineal member longitudinally extending portion.

5. A vehicle frame as set forth in claim 4 wherein said lineal member longitudinally extending portion comprises a slot and said core longitudinally extending portion comprises a key projecting into said core.

* * * * *